Aug. 30, 1966 C. R. WALDROP 3,269,153
AUTOMATIC WASHER
Filed June 1, 1964 9 Sheets-Sheet 1
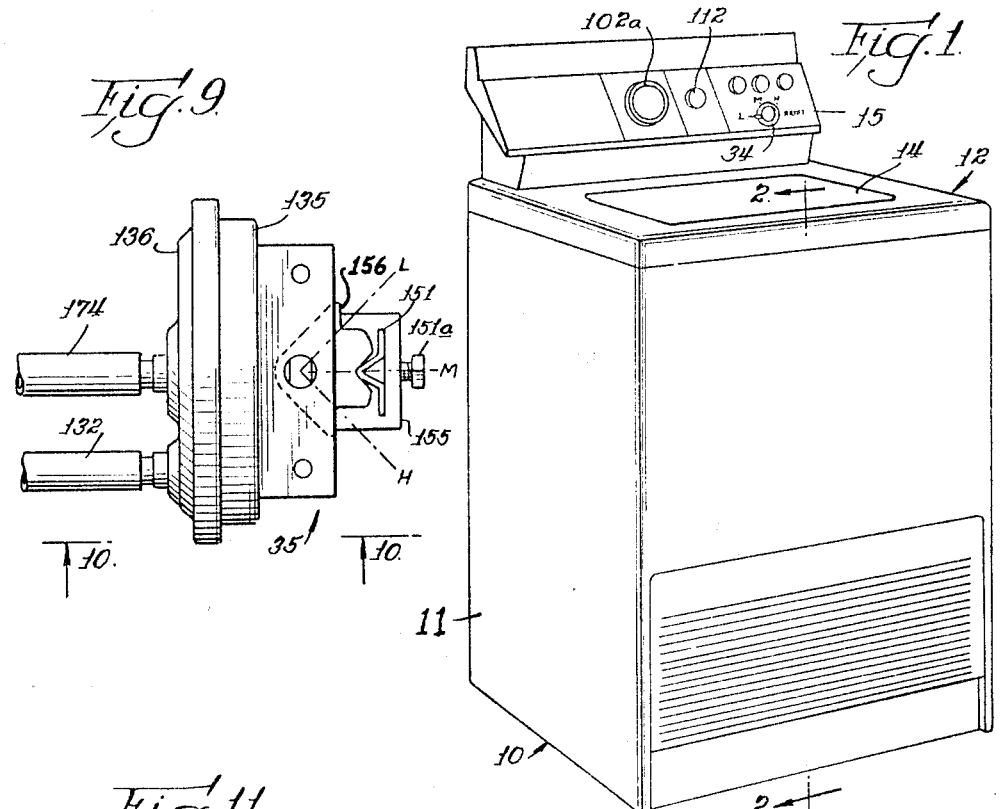
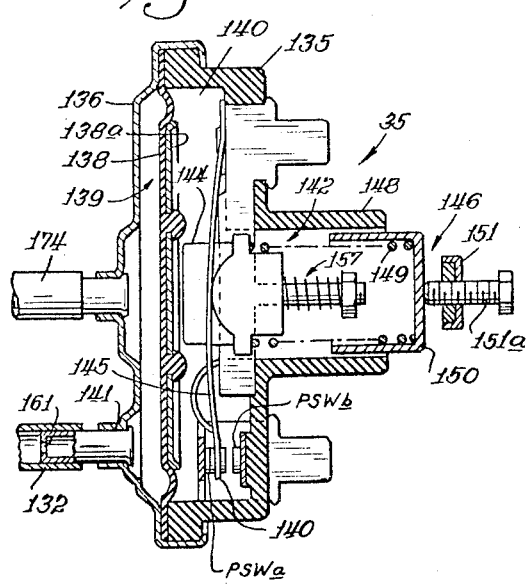
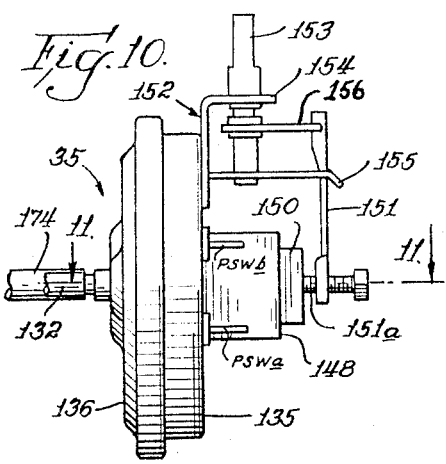
Inventor
Charles R. Waldrop
By Peter S. Lucyshyn
Att'y

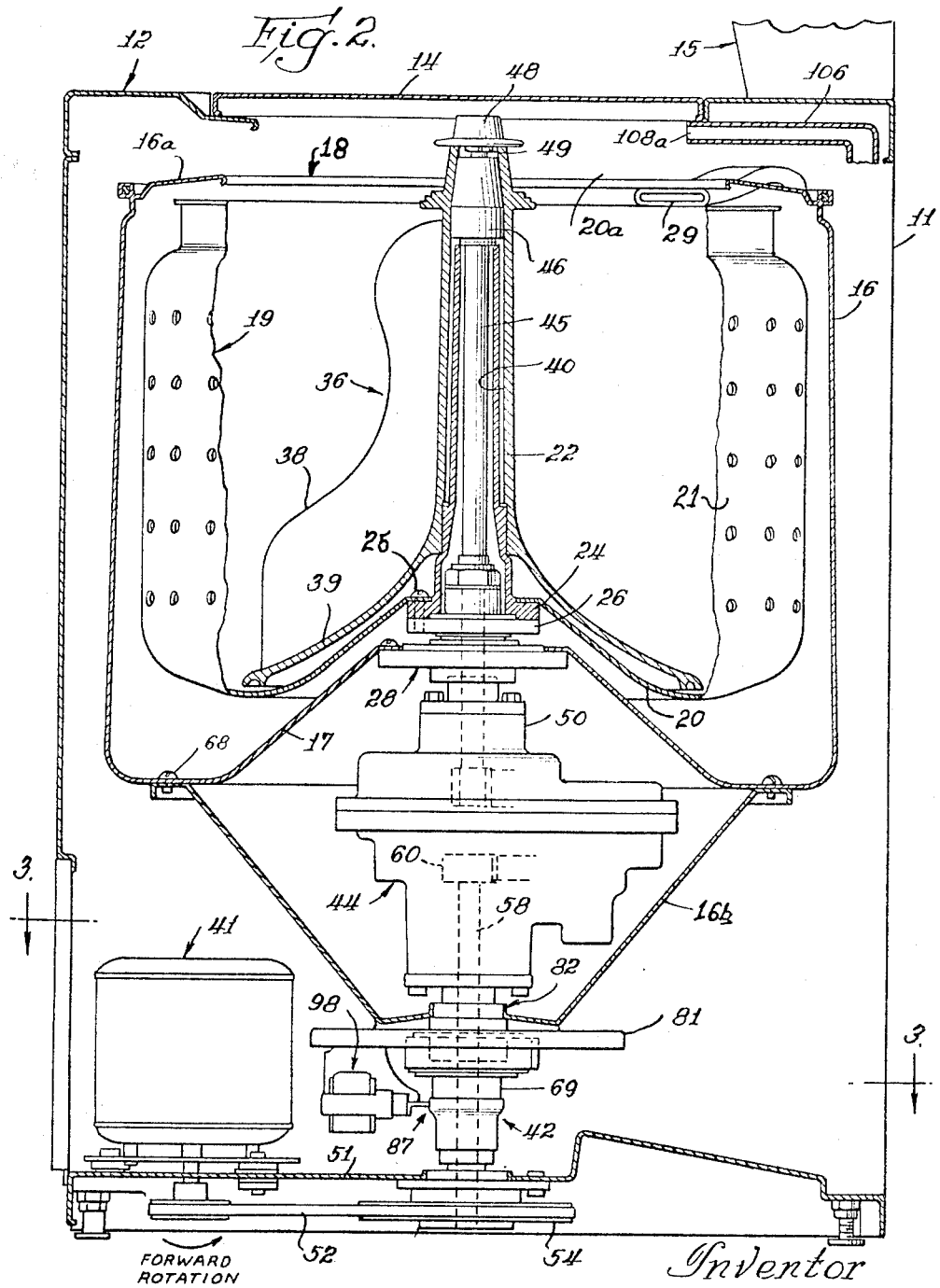

Aug. 30, 1966 C. R. WALDROP 3,269,153
AUTOMATIC WASHER
Filed June 1, 1964 9 Sheets-Sheet 3

Inventor
Charles R. Waldrop
By Peter S. Lucyshyn
Att'y

Aug. 30, 1966  C. R. WALDROP  3,269,153
AUTOMATIC WASHER
Filed June 1, 1964  9 Sheets-Sheet 4
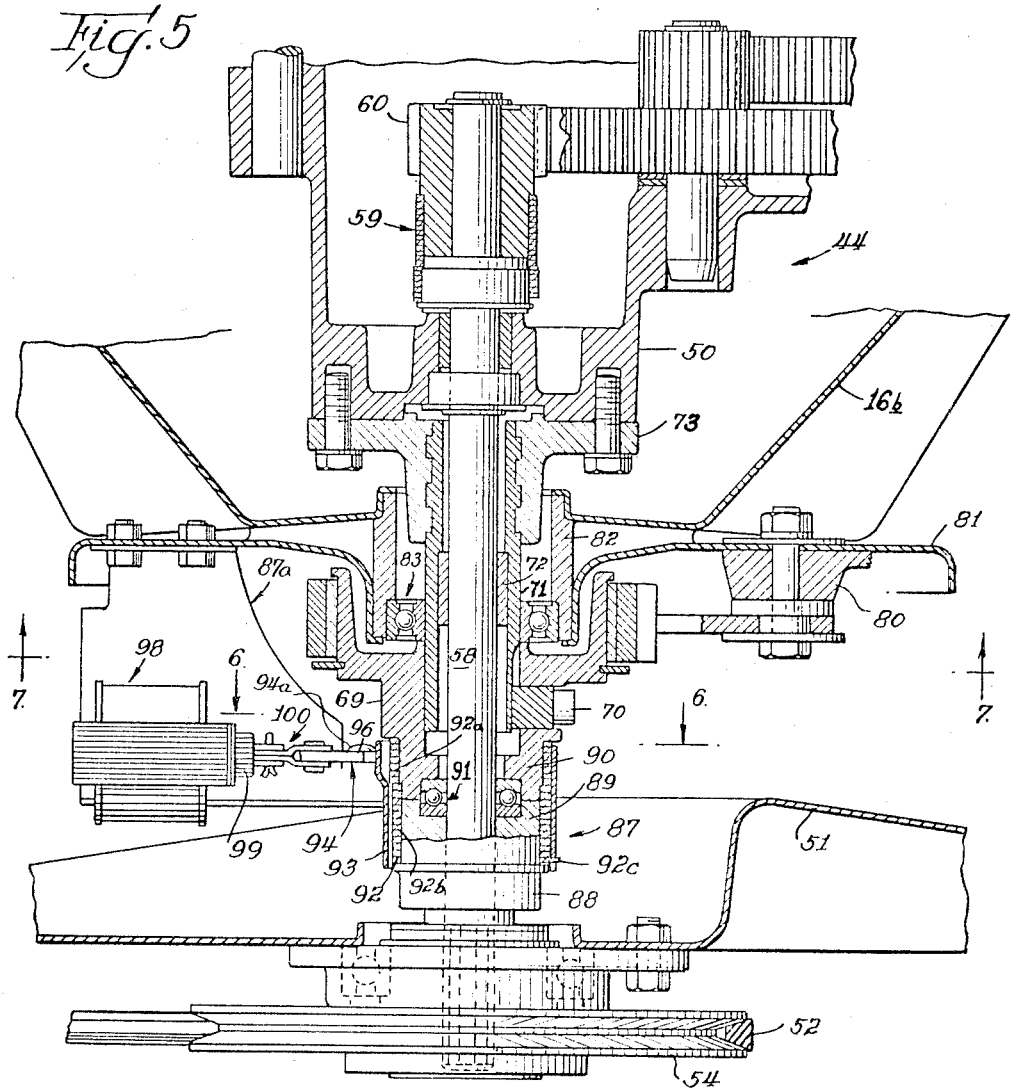
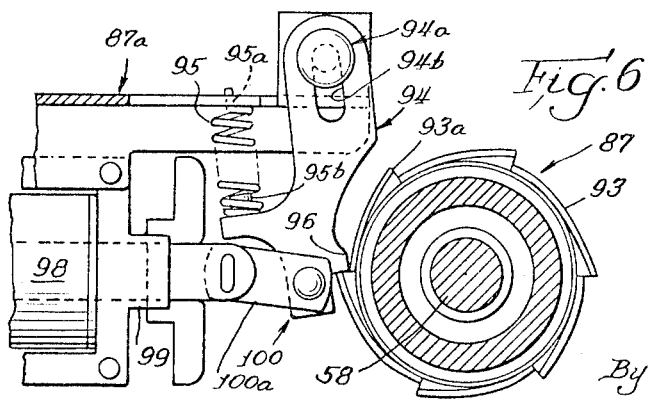
Inventor
Charles R. Waldrop
By Peter S. Lucyshyn
Atty.

Aug. 30, 1966
C. R. WALDROP
3,269,153
AUTOMATIC WASHER
Filed June 1, 1964
9 Sheets-Sheet 5
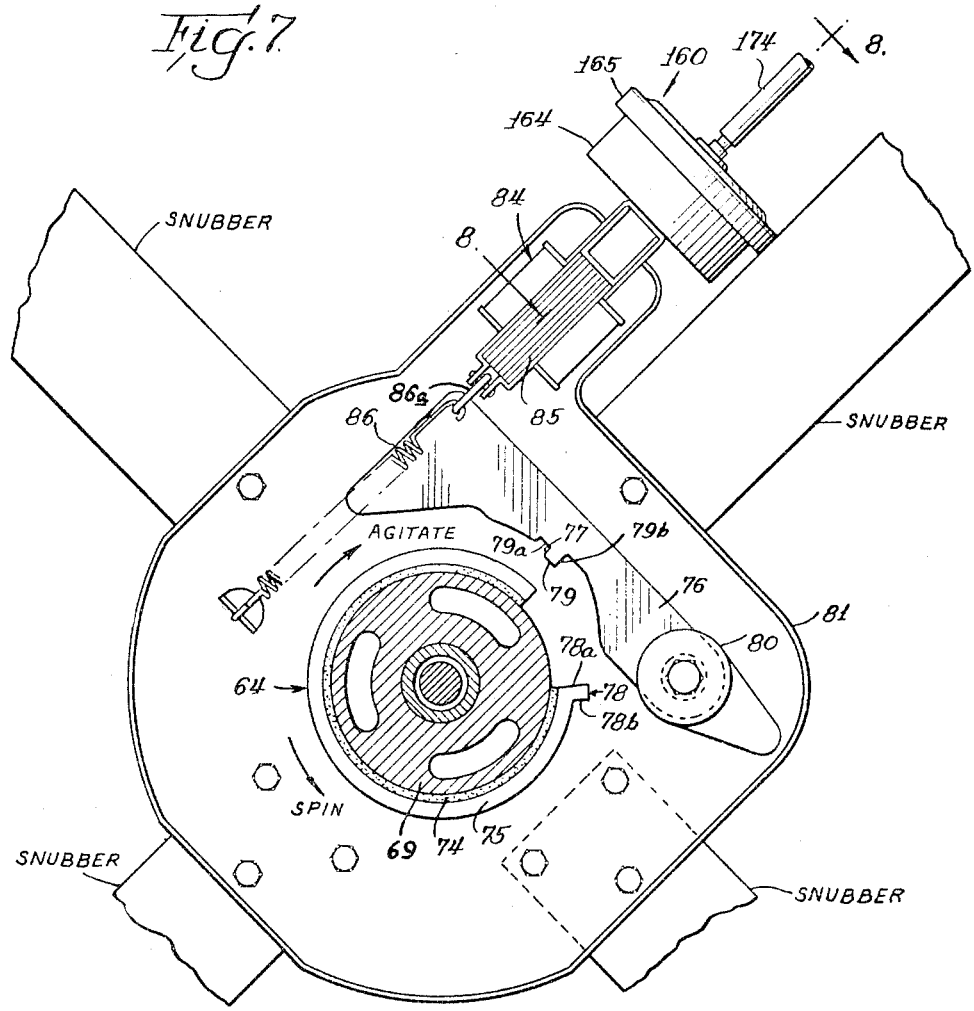
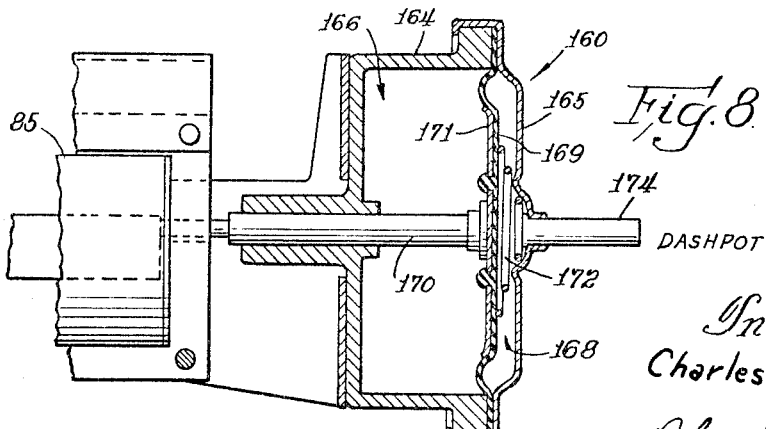
Inventor
Charles R. Waldrop
By Peter S. Lucyshyn
Att'y Aug. 30, 1966     C. R. WALDROP     3,269,153
AUTOMATIC WASHER
Filed June 1, 1964     9 Sheets-Sheet 6
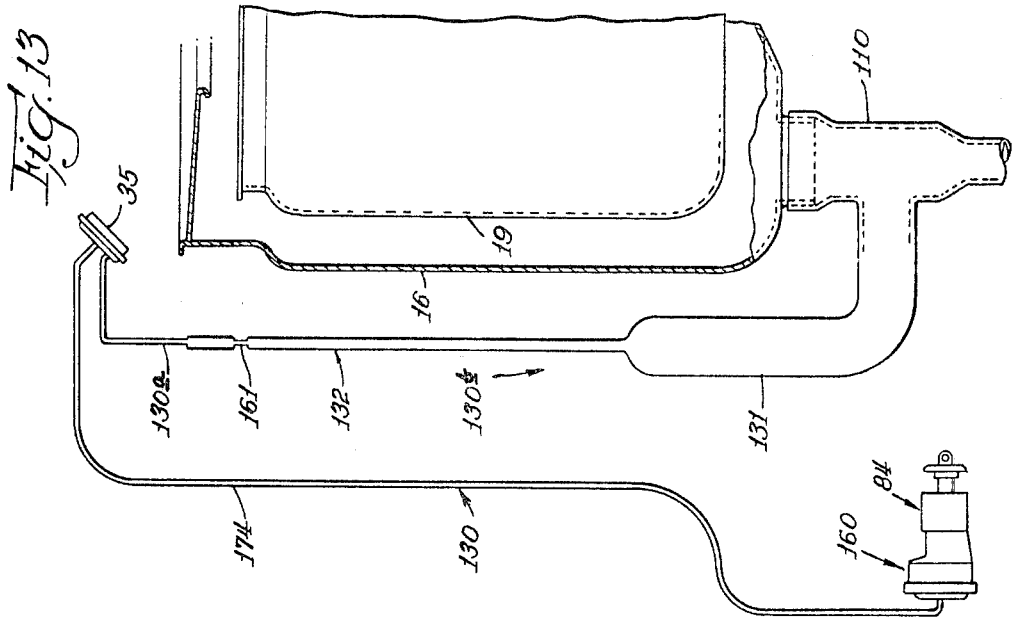
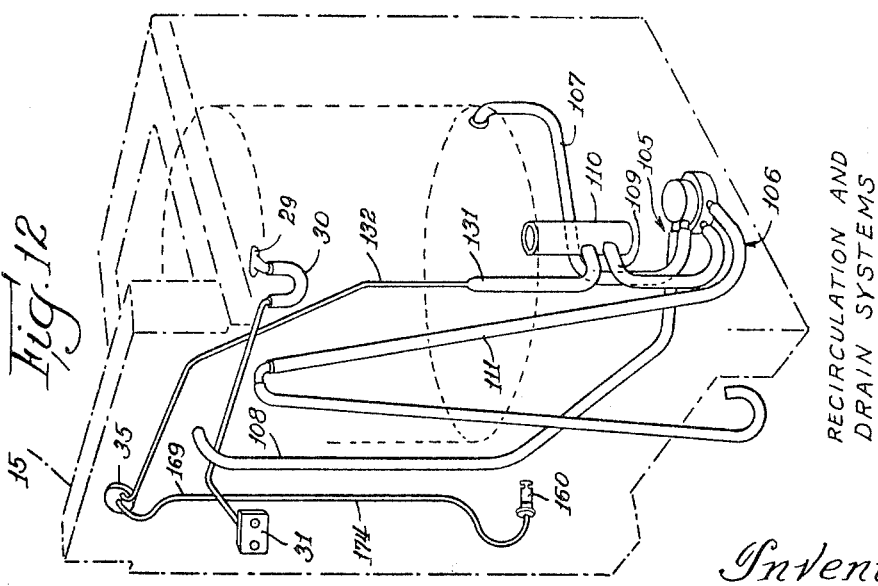
Inventor
Charles R. Waldrop
By Peter S. Lucyshyn
Atty.

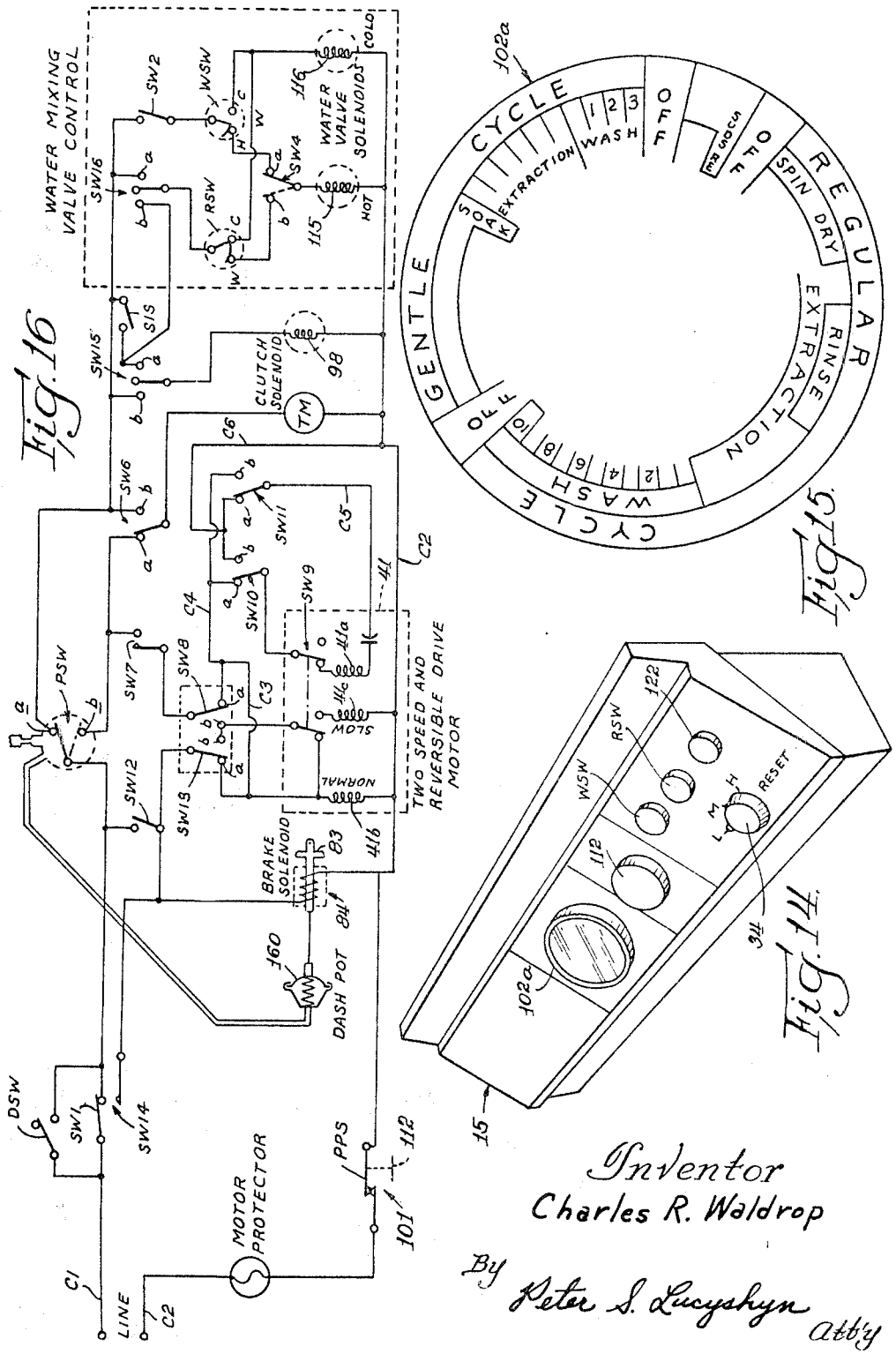

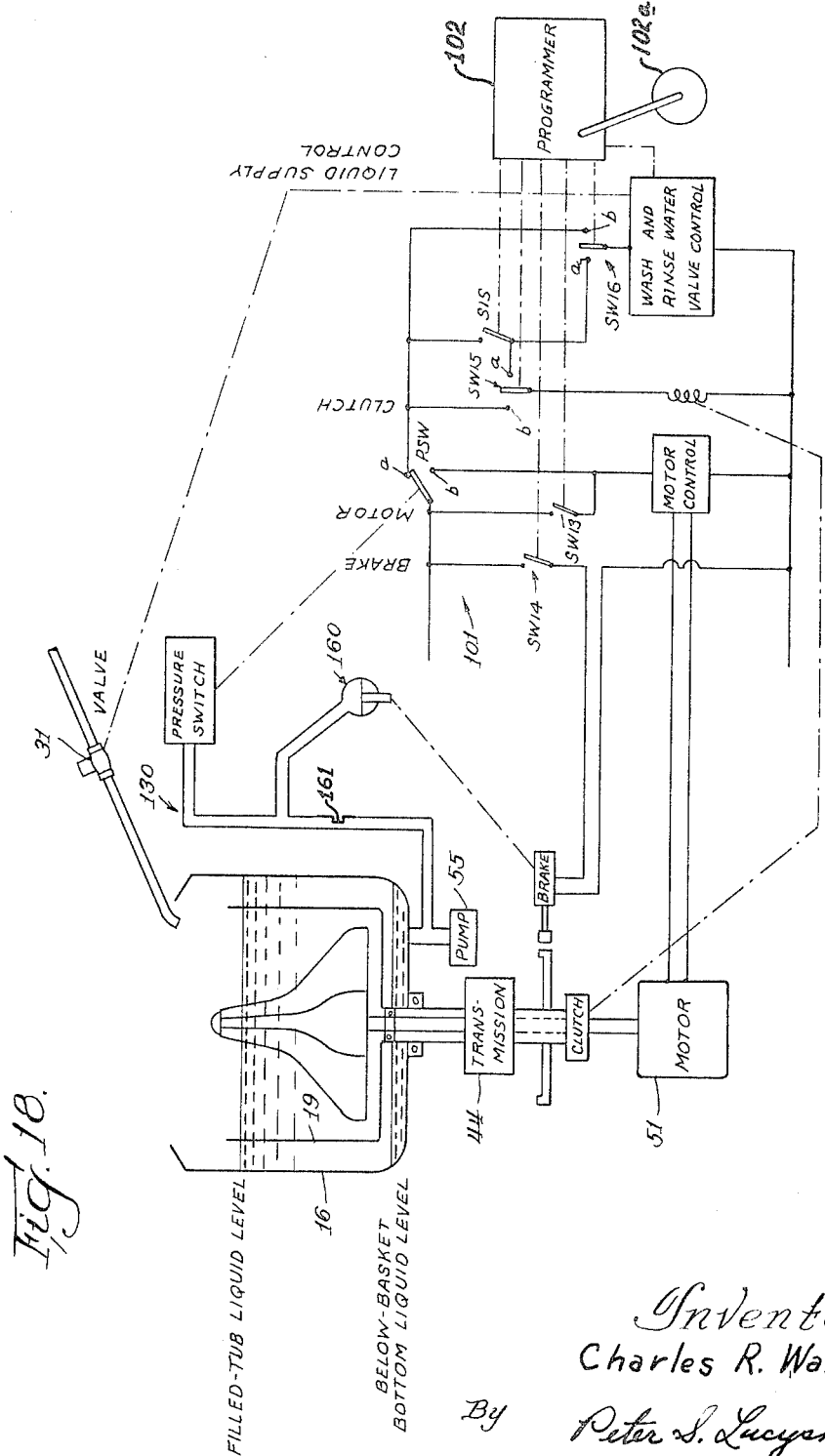

United States Patent Office 3,269,153
Patented August 30, 1966

3,269,153
AUTOMATIC WASHER
Charles R. Waldrop, Herrin, Ill., assignor to Borg-Warner Corporation, Chicago, Ill., a corporation of Illinois
Filed June 1, 1964, Ser. No. 371,670
4 Claims. (Cl. 68—12)

The present invention relates to operation of a washing machine and more particularly to the extraction operation in an automatic washer.

Customarily, the first step in the operation of an automatic washing machine is to place together in the washer clothes or other articles, water, and a cleaning agent such as soap, detergent or the like. These are agitated during a "wash" cycle to loosen and, for the most part, remove dirt and grime from the articles being washed. After the wash cycle, the water is drained. There is, however, a significant portion of water and suds trapped by the clothes. As a part of the "extraction" cycle, it is desirable to remove as much of this water and suds as possible before fresh water is fed into the machine for a subsequent "rinse" cycle. This is because the rinse water will thereby not carry in suspension as much suds, dirt and the like and thus be more effective in rinsing the clothes. The clothes, in the end, come out of the washer in a much "fresher" condition if all the cleaning agent and suds are removed in the rinse cycle.

One manner in which such water, suds and the like are removed prior to the final "rinse" cycle is to spin the container in which the clothes are carried. However, if a perforate basket is used during spinning, suds form and build-up between the rotating container and the stationary tub and thereby apply a drag to the container. This is the undesirable condition known in the art as "suds-lock." Suds-lock also may occur if spinning is started before the wash water is drained to a level where the basket does not apply turbulence to it either by directly contacting it or creating air turbulence which "beats-up" suds.

It is an object of the present invention to prevent suds-lock in the spin operation of a washer to remove wash liquid and suds. While not so limited in its application, the invention will find especially advantageous use in an automatic washer where water is drained after a wash cycle and a clothes container, ordinarily a perforate basket, is spun to remove the suds and wash water retained or trapped by the articles being washed and suds are beat-up or formed in the process. To this end the washer operation includes introduction of fresh, rinse water to wash down or dilute the suds and wash water as part of an initial suds removal operation of the washer.

It is a more specific object of the present invention in accordance with the above to provide an automatic safety control for a washer which effects liquid introduction after the wash liquid has been substantially drained to wash away suds formed during removal of undrained wash water trapped in articles being washed by a spinning operation.

It is an overall object of the present invention to provide an improvement for a washer which eliminates the problem of suds-lock and is both easy to adapt to standard washers and is also economical to manufacture.

These and other objects and advantages of the invention will become more clearly understood from the description and the drawings in which:

FIGURE 1 is a perspective of an automatic washing machine embodying the present invention;

FIGURE 2 is a sectional elevation taken along 2—2 in FIGURE 1;

FIGURE 5 is a vertical sectional view of the drive mechanism of the washing machine;

FIGURE 6 is a plan view of a clutch assembly of the drive mechanism of FIGURE 5, said view being taken along 6—6 in FIGURE 5;

FIGURE 7 is a plan view of a brake assembly of the drive mechanism of FIGURE 5, said view being taken along 7—7 in FIGURE 5;

FIGURE 8 is a sectional view of a control for the clutch assembly shown in FIGURE 6, said view being taken along 8—8 in FIGURE 7;

FIGURE 9 is a plan view of a combination water level pressure and clutch control switch;

FIGURE 10 is an elevational view of the pressure switch of FIGURE 9;

FIGURE 11 is a sectional view of the pressure switch taken along 11—11 in FIGURE 10;

FIGURE 12 is a diagrammatic showing of the liquid flow and control system, including respective fill, recirculation and drainage flow lines in the washing machine;

FIGURE 13 is a diagrammatic showing of the liquid level sensing and pneumatic clutch control arrangement;

FIGURE 14 is a perspective of a washing machine backguard including programming and liquid level controls;

FIGURE 15 is an elevation of the programming control indicating different operations of two cycles of the washing machine;

FIGURE 16 is a schematic of the washing machine control circuit;

FIGURE 18 is a simplified illustration in diagrammatic form of the control circuit and operative units in the automatic washer of FIGURES 1–16.

GENERAL

Figure 3:
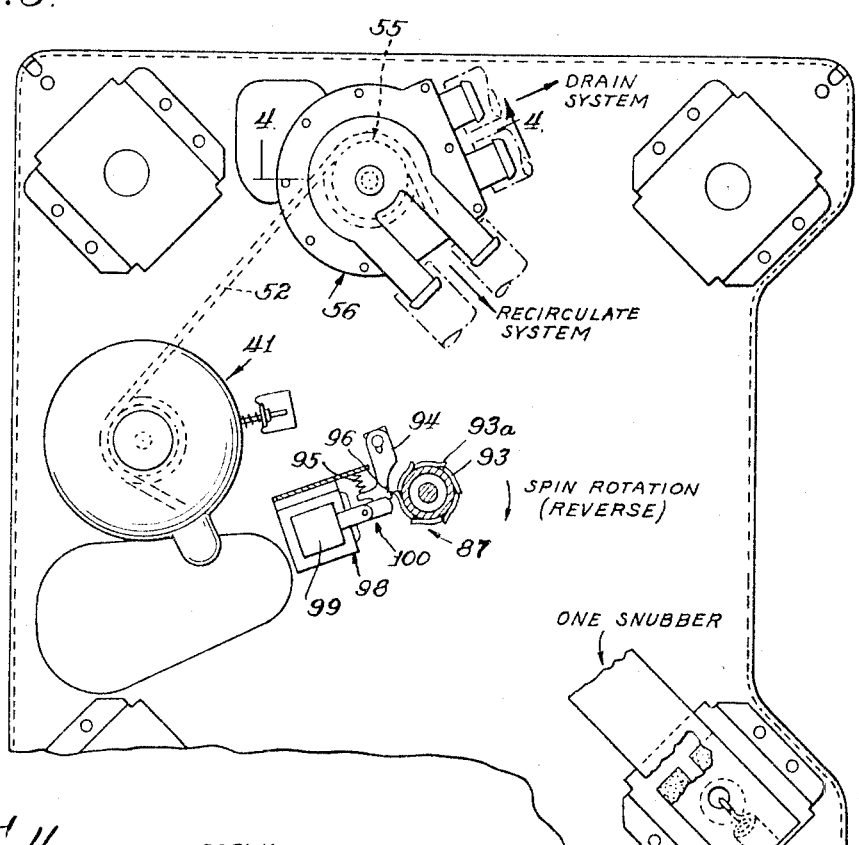
FIGURE 3 is a plan view of the washing machine base assembly, taken along line 3—3 of FIG. 2.

Referring now to the drawings, shown in FIG. 1 is an automatic washer 10 in which the present invention finds particular applicability. The automatic washer 10 includes an outer cabinet 11 having a top 12 hingedly supporting a loading and unloading door 14 and carrying a backguard 15 on which are mounted controls for the washing machine. As best shown in FIG. 2, a tub 16 having an annular cover 16a is provided inside the cabinet 11 having a bottom 17 and a top opening 18 beneath the door 14. Forming a container for clothes or other articles to be washed is a perforate basket 19 having a bottom 20, top opening 20a and sides 21 mounted on a vertically disposed center post 22 inside the tub 16.

Relative rotation between the tub and basket is permitted. In the present instance this is achieved by fastening the bottom 20 of the basket to a center post base 24 using screws 25 (one of which is shown). The center post base 24 is anchored to a spin hub 26 which is rotatably journalled in a bearing assembly 28 mounted in the tub bottom 17.

For feeding water into the tub to wash or rinse the clothes, a flume 29 is provided mounted in the tub cover 16a (opening 18). The flume is connected by a hose and conduit 30 to a water input control valve 31 (see FIG. 12). In the illustrative embodiment the level of water is selected by positioning a rotatable control knob 34 which is connected to a water level control switch 35, in the present instance a pressure responsive switch. The pressure switch control for providing a selected level of liquid in the tub is discussed in further detail subsequently, it is here noted that the selector control 34 can be moved to one of three positions, low, medium, or high for providing these relative levels of liquid in the tub (see FIGS. 1 and 9).

To agitate the clothes during washing or rinsing, the basket 19 is held stationary while an agitator 36 having a plurality of vanes 38 and a skirt 39 is oscillated to and fro. The agitator has a central opening 40 for receiving the center post 22 and is rotatably supported thereon. The center post remains stationary while the agitator oscillates.

After the tub has been filled to the level selected by control 34, a wash cycle of operation begins lasting for a selected preset first period of time, exemplarily shown as ten minutes. At this time reversible oscillatory drive is transmitted to agitator 36 from a motor 41 through a first drive train including a lower drive assembly 42, a transmission 44 and an agitator drive shaft 45 (see FIG. 2). In the exemplary embodiment, the drive shaft 45 extends centrally through the hollow center post 22 and carries a drive block 46 at its upper end. The upper end of the agitator central opening 40 is formed to engage the drive block 46 so that the two structures turn as a unit. For maintaining the agitator seated on the drive block, a cap 48 is threaded on a stud 49 extending from the upper end of the drive block 46.

The wash cycle is completed during the first period of time, and a second period of time begins with wash water being pumped out of the machine. Also, in the second time period the basket 19 is spun at a relatively high speed to extract wash water from the clothes. The side walls 21 of the basket are perforated so that the water is expelled therethrough. The washer operation during the second time period is intended to remove or extract remaining portions of cleaning agent, suds and suspended dirt in the suds and water laden clothes before a final rinse operation. Connectively, the initial suds removal and the last rinse and spin are termed the "extraction cycle."

Describing a second drive train for effecting spin rotation of the basket 19, the lower drive assembly 42 is constructed so as to rotate the transmission 44 as a unit including a transmission housing 50. The housing 50 is coupled to the spin hub 26 which supports the center post 22 and basket 19. Accordingly, spinning of the transmission effects rotation of the basket 19.

FIRST AND SECOND DRIVE TRAINS

Turning to the respective drive trains in the illustrative washing machine in more detail, the motor 41 is mounted in inverted fashion on a base plate 51 extending across the bottom of the washing machine 10 (see FIGS. 2, 3). The motor has a drive shaft which extends below the mounting plate 51 and carries a drive pulley which is coupled by a belt 52, in the present instance, a V-drive belt, to a pair of driven pulleys 54, 55, one pulley 54 coupled to drive the lower drive assembly 42 and the other pulley 55 coupled to drive a twin impeller pump 56. As is explained subsequently, pump 56 operates selectively as a recirculation pump or as a drain pump. Each of the driven pulleys are disposed below the base plate 51 while the driven mechanisms, the lower drive assembly 42, and the pump 56 are mounted atop the base plate 51. The driven pulley 54 is suitably fastened, in the present instance by a spline and key fit (see FIG. 5), to a main drive shaft 58 extending upwardly from the pulley 54 through the lower drive assembly 42. The upper end of shaft 58 is coupled via an overrunning or one-way spring clutch 59 to a transmission including a drive pinion 60. The transmission is shown and described in Gerhardt et al. U.S. Patent No. 2,807,951, assigned to Borg-Warner Corporation. The one-way spring clutch 59 provides drive to the transmission drive pinion 60 to transmit an oscillatory drive to the agitator during forward rotation of drive shaft 58, while disconnecting drive to pinion 60 during reverse rotation of shaft 58. Accordingly, to effect oscillation of the agitator, the drive shaft 58, as a part of the first drive train, is rotated in a forward direction thereby operating the one-way clutch 59 so that the gear train in the transmission 44 effects oscillation of agitator drive shaft 45.

BRAKE

As described, the basket 19 is rotatable with respect to the tub 16. It is, however, undesirable during the agitation cycle to have the basket freely moving. On the other hand, washer operation is smoothed and motor strain is reduced by permitting slight movement of the basket at the point where the agitator reverses direction in its oscillatory operation. In addition, following high speed spin of the basket, structure must be provided to slow down the basket. Thus, the second drive train includes a brake assembly 64 to retard movement of the transmission housing and thereby the basket 19 during agitation (see FIGS. 5, 7). The brake assembly and its operation are the subject of co-pending application of Clarence M. Overturf and Richard L. Conrath, Serial No. 371,347, filed June 1, 1964. As explained, agitation drive is through the first drive train. The brake assembly 64 includes a brake hub 69 suitably fastened, in the present instance by a clamp 70, to a basket tube 71 coaxial with drive shaft 58 and rotatably held with respect thereto by a bearing 72. A hub 73 is cast on the upper end of the basket tube 71. The hub 73 is mounted on the lower end of the transmission housing 50. Accordingly, the tube 71 and the transmission housing 50 operate as a unit, thus by holding the tube 71 stationary the transmission housing and basket are held against rotation.

To retard basket rotation, the brake hub 69 is surrounded by a brake lining 74 which is tightly held against the hub by a brake band 75, in the present instance constructed of spring steel. As shown in FIG. 7, braking is effected by selectively holding the brake band against rotation by engaging it with a brake latch 76. For this purpose the brake band has an integral tang 78 engaging a projecting finger 79 on the latch 76. The latter is pivotally mounted on a brake latch pedestal 80 depending from a support bracket 81. The bracket 81 is mounted on a suspension tube 82 which is supported in a bearing 83 carried in the brake hub 69.

The brake latch 76 is normally biased so that the finger 79 engages the brake band 78. To this end, a biasing spring 86 is carried by the brake bracket to pivot latch 76 about pedestal 80. The illustrated structure permits engagement of the brake during rotation of the brake band 75, and therewith basket 19, in either the forward or reverse directions. To engage the brake during forward rotation of the drive shaft, the agitate direction, the brake band tang 78 is received in a latch recess 79a partially formed by a side of projecting latch finger 79. The provision of a recess 79a assures the holding of the brake band 75 and thereby retarding basket 19 against rotation in either direction. To engage the brake in the reverse direction of rotation of the brake band, necessary during high speed spin of the basket, face 78a of tang 78 is engaged with face 79b of finger 79. The particular problem of engagement of the two faces at high speeds without "throwing" the latch, is solved, in the illustrative embodiment, by undercutting face 78a. As shown in the drawings, the face 79b of the finger receives a component of force acting substantially in line with the latch pivot point at pedestal 80. Concentrating the point of impact by using an undercut tang face 78a substantially eliminates components of force acting to pivot latch 76 about pedestal 80 and throwing the latch so that the tang is not engaged.

Free rotation of the brake hub and appended structure, i.e. transmission housing and basket, is permitted by disengaging the latch 76 and the brake band 75. For this purpose a solenoid 84 has an armature 85 linked by a hook 86a to the brake latch 76 to act against the spring biasing force. Thus, when it is desired to spin the basket, the transmission housing is freed for rotation by energizing the brake solenoid 84 and releasing the brake 64.

Supporting the tub is an inverted generally frusto-conical shaped support 16b tapering down from the peripheral edge of the tub bottom to the bracket 81 and suspension tube 82 (FIG. 2). To permit limited movement or tipping of the tub, basket and drive mechanism from a vertical axis caused by unbalanced washer loads, yet to dampen any vibration, the bracket 81 is snubbed by a set of four damping assemblies which, in the present instance, connect the bracket holding the tub support 16b to the respective four corners of the base plate 51. Details of the snubber or damping assembly structures do not comprise any part of the present invention and thus are not described in detail herein but the structure and its effectiveness in smoothing machine operation are described in the Gerhardt et al. U.S. patent, supra.

CLUTCH

To initiate spin rotation of basket 19, the drive shaft 58 is rotated in the reverse direction and, as a part of the second drive train, is drivingly coupled to rotate the transmission housing 50 and spin basket 19. In the present instance coupling is effected by engagement of a clutch 87 (see FIG. 5). The clutch structure and its operation are the subject of a co-pending application of Robert Beare, Serial No. 371,312, filed June 1, 1964. The preferred embodiment of the clutch 87 is of the overrunning of one-way type and transmits drive from a lower drive hub 88 to the brake hub 69. As has been explained, the brake hub is coupled to the transmission housing 50 through the basket tube 71. The lower drive hub 88 is spline-fitted on the main drive shaft 58 and held thereon by, for example, a set screw (not shown). The clutch 87 includes a lower drive column 89 and an upper driven column 90. The lower drive column 89 is an integral extension of the lower drive hub 88. The upper driven column is a depending extension of the brake hub 69. The ends of the two columns abut opposite sides of a bearing 91 which permits relative rotation therebetween. A clutch spring 92 has respective upper and lower portions 92a, 92b which extend over the respective ends of the upper driven column and the lower drive column.

The clutch spring 92 is of the coil type and surrounds the respective circular drive transmitting columns. Rotation of the lower drive column 89 in one direction causes the clutch spring 90 to tighten and wrap around both columns. This effects transmission of drive from the lower column 89 to the upper column 90. Rotation of the lower drive column 89 in the opposite direction uncoils or loosens the spring so that drive is not transmitted to the upper column 90.

Selective driving in the wrap around or drive direction is effected, in the exemplary embodiment, by using a clutch shield 93 extending about the spring 92 and holds an end 92c of the lower spring portion 92b (see FIG. 5). The sleeve 93 and spring 92 are selectively retarded against rotation, as shown in FIG. 6, by providing on the upper end of shield 93 a plurality of projecting ears 93a engageable by a clutch pawl 94. The pawl 94 is biased by a spring 95 so that a projecting finger 96 can engage one of the ears 93a. The result is that even though the spring 92 fits snugly about the lower drive shaft or column 89 it can be held stationary during rotation in a direction which would otherwise tighten the spring and effect drive from column 89 to column 90, thereby permitting precise, selective spin drive of the basket 19.

To engage the clutch spring 92, the shield 93 is released and the spring is permitted to wrap around the respective drive and driven columns 89, 90. It is, of course, understood that the driven column must be rotating in the proper direction to effect tightening of the spring about the respective columns (see FIG. 3). The pawl 94 is disengaged in the present instance by energizing a solenoid 98 which has an armature 99 connected by linkage assembly 100 to the clutch pawl and pivots the latter against the force of the biasing spring 95.

The motor 41 is reversible to rotate pump 55 and main drive shaft 58 in either direction. The motor has a start winding 41a and a pair of run windings 41b, 41c (see FIG. 16). Direction of rotation is determined by the relative polarity between the start and run windings, i.e. simply by reversing the relative polarity rotation of the motor is reversed. Only one run winding is used at a time, energization of winding 41b gives normal speed operation while winding 41c gives slow speed operation.

Energization of the motor winding is controlled by a control circuit 101 in response to operation of a programmer in the present instance, a timer or sequential controller 102 (FIG. 18). As shall be explained in detail subsequently, timer 102 "instructs" circuit 101 by operating appropriate switches therein to control the washer operations as exemplarily set out on timer dial 102a, i.e. "wash" and "extraction," the latter including respective "rinse" and "spin dry" cycles.

Upon receiving wash or agitate instructions the control circuit 101 effects motor rotation in a forward direction to rotate the shaft 58 and thereby drive the transmission gear train through the one-way clutch 59 to oscillate the agitator 36.

In response to spin instructions the control circuit 101 reverses the direction of motor rotation. As explained, the transmission one-way clutch 59 is inoperative in the reverse direction of motor rotation, thus oscillatory drive is not transmitted to the agitator. The control circuit first energizes brake solenoid 84 to release brake 64 permitting free movement of the basket 19 and housing 50. Subsequently, upon operation of liquid level sensor switch 35, as explained in a later part of the specification, the circuit energizes the clutch solenoid 98 to engage clutch 87 so that a drive connection is completed for rotating the transmission housing and spinning the basket 19.

PUMP

Figure 4:
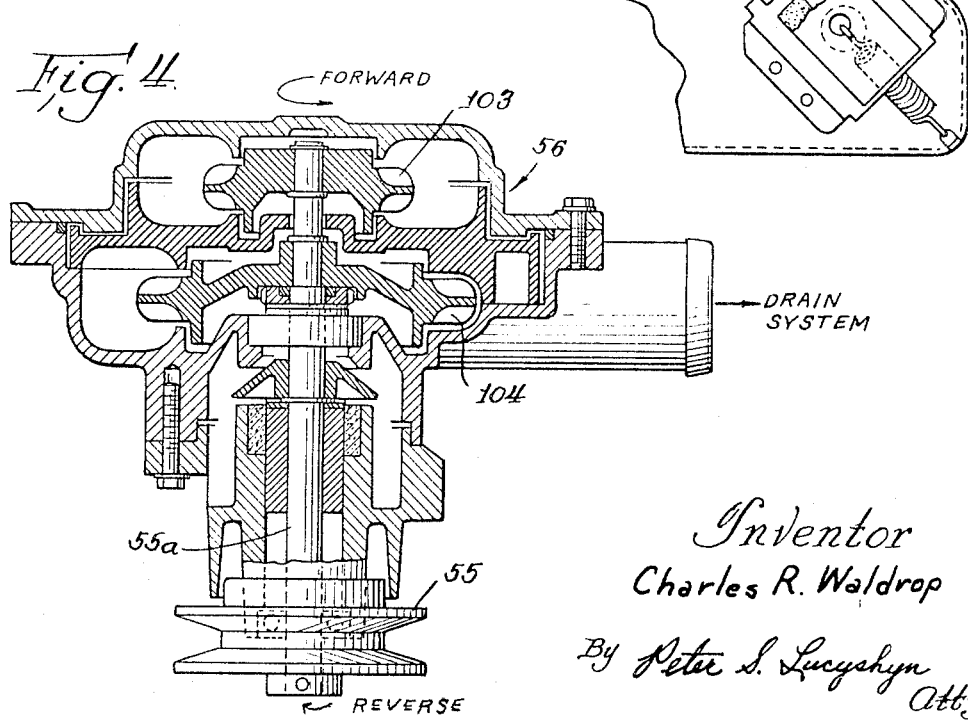
FIGURE 4 is an enlarged sectional elevation of a washing machine pump taken along 4—4 in FIGURE 3.

To recirculate water during the washing operation and to drain water prior to the spinning operation, the pump 56 is provided (see FIG. 4). This is a dual impeller pump having an upper impeller 103 and a lower impeller 104. The impellers are carried on a common shaft 55a the lower end of which holds the pulley 55 coupled to the motor by V-belt 52. In one direction of rotation the upper impeller recirculates water via a system 105 and in the opposite direction of rotation the lower impeller 104 drains water through a sytsem 106.

The respective circulation and drainage systems 105, 106 are best shown in FIG. 12. A hose 107 couples the recirculation impeller 103 to the lower part of the side of tub 16. The connection is just above the bottom of the tub so that soil, pebbles, and like materials are not recirculated. An output hose 108 returns the water to the tub 16 through a flume 108a located adjacent the tub top (see FIG. 2).

To remove or drain liquid from the tub, control circuit 101 initiates reverse rotation of the motor to effect liquid pumping operation of drain impeller 104. A hose 109 couples the drain impeller to a sump 110 at the bottom of tub 16 to draw water out. The wash or rinse water is forced out by the lower impeller into a drain hose 111 and carried to an appropriate drain connection (not shown).

During forward rotation of pump pulley 55 and while upper impeller 103 is recirculating water in the tub, the lower impeller 104 is acting so as to draw air through hose 111. As preferably constructed the lower impeller 104 will not draw liquid from the sump 110 during forward rotation of pump pulley 56.

In the opposite direction of pump pulley rotation, reverse direction as occurs during spin operation of the washer and while lower impeller 104 is removing water from the tub, the upper impeller 103 is drawing air through hose 108. In the preferred embodiment, the upper impeller will not draw liquid from tub 16 during reverse rotation of pump pulley 56. The pump is described in further detail in Pinder, U.S. Patent No. 2,938,130 issued May 9, 1961.

CONTROL CIRCUIT

As noted, the overall operation of the washing machine is controlled by the programmer 102 instructing a control circuit 101. The programmer is a time-motor TM operated unit which closes and opens respective contacts in timed sequence so as to effect specific operations in the control circuit. The timer structure is explained in further detail in copending application of Carl J. Knerr, Serial No. 254,640 filed January 29, 1963. In order to facilitate understanding of the programmer and control circuit a simplified diagram of the control system and coupled mechanical structure is presented in FIG. 18.

Figure 17:
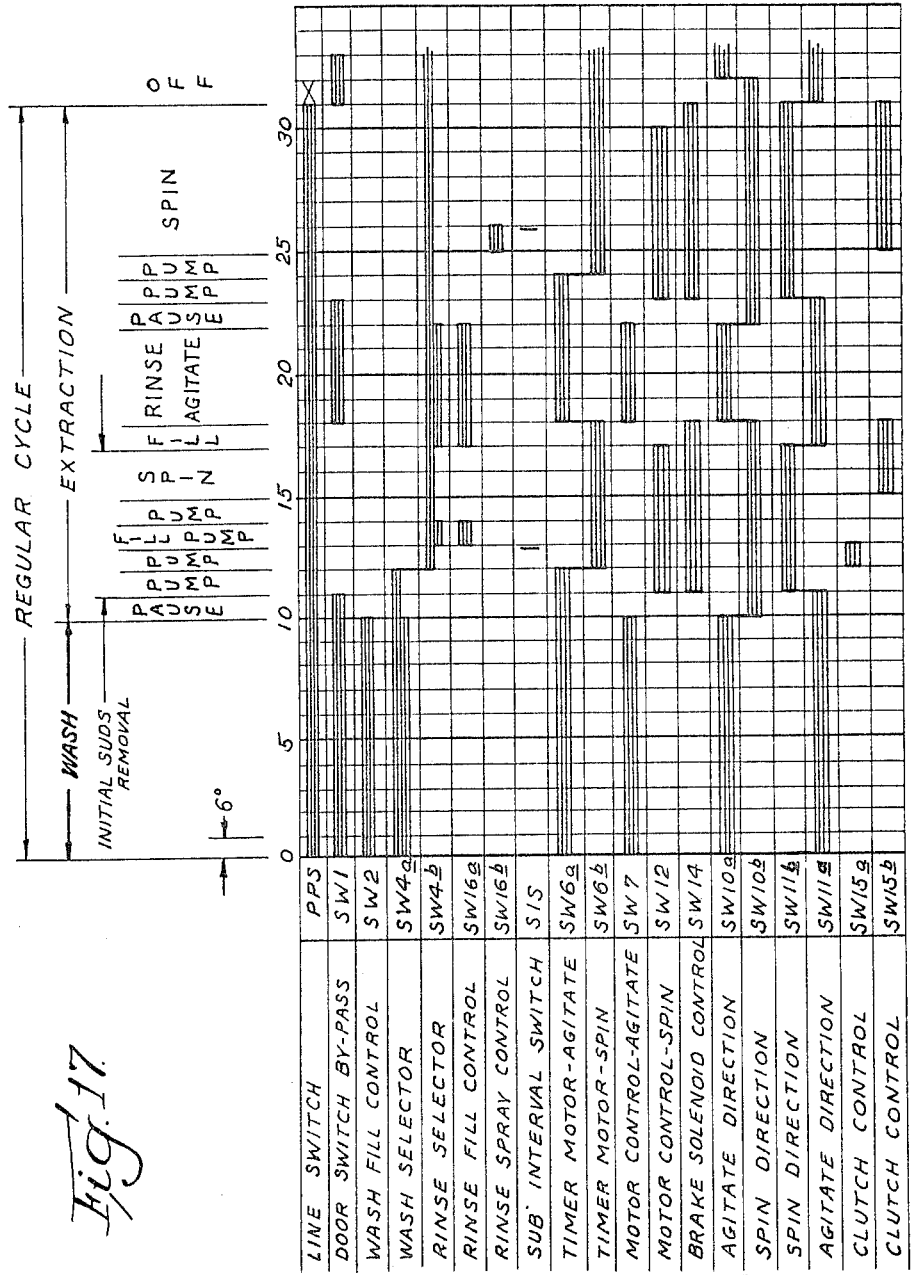
FIGURE 17 is a cam sequence chart illustrating the cycles of operation of the automatic washing machine of FIGURES 1–16, inclusive.

The timer sequence chart of FIG. 17 illustrates the contacts of switches that are opened and closed at any given position of timer operation. To establish exactly the electrical components functioning at any given time during specific cycles of machine operation, it is only necessary to establish which sequences are of interest and then to identify the switches that are closed as represented by the dark squares on the timer sequence chart. Each individual energizing circuit, during a given period, may thus be identified by using the timer sequence chart and referring to the switches in the electrical circuit schematic in FIG. 16.

Turning to the control circuit 101 and FIGS. 16, 17 and 18, it effects operation of the mechanical units of the washer in automatic sequence through a cycle of operation as set forth in the chart of FIG. 17. A source of electrical power represented by the term "line" between a pair of conductors C1, C2 energizes the circuit when contacts PPS of a manually operable push-pull switch 112 are closed. To provide an emergency stop when the machine top door 14 is opened, a door actuated switch having contacts DSW is provided. This is necessary during high speed spinning of basket 19 to prevent the person opening the door from being injured. The brake solenoid 84 is immediately deenergized to effect braking and the clutch solenoid 98 is deenergized to disconnect spin drive of the basket. It is desirable, however, during the wash and rinse operations of the machine cycle that access be permitted to the tub and basket without stopping the machine. Thus a set of door by-pass switch contacts SW1 are provided and, as shown in the chart of FIG. 17, these are closed during the wash and agitate operations of the machine.

The programmer 102 initially prepares the circuit 101 for feeding water into tub 16. The desired temperature of the wash water is selected by operating a knob 114 which controls a set of switch contacts WSW. The switch contacts can be moved to either of the following positions: where only a hot water valve solenoid 115 is energized; where only a cold water valve solenoid 116 is energized; or where both solenoids 115, 116 are energized to feed warm water into the tub. The respective hot and cold water valves are contained in the main water valve which is thereby coupled to the circuit so that water input to the tub can be controlled, either turning it on or turning it off. The energizing circuit for the water valve solenoids includes a contact assembly PSW of pressure switch 35, specifically a contact PSWa, and a pair of timer-operated switches SW1 and SW4, the latter having contacts a and b to provide selective isolation of the hot water supply during rinse operation of the machine (C1–SW1–PSWa–SW2–WSW–SW4a–115 or 116–PPS–C2). The pressure switch 35 remains on contact a until the water level in the tub is high enough to apply a pressure to the switch and put the switch on contact b. This deenergizes the water valve solenoids to close the valves and shut off the water flow. The details of the pressure switch are given later.

The motor windings 41a, 41b, 41c are selectively coupled to the energization source by the control circuit 101. The motor is rotated in the forward direction to effect agitation and recirculation in the machine when the pressure switch moves to contact PSWb. Explaining the motor energizing circuit, the timer instructs the closing of a switch contact SW7. A contact SW8a is normally closed and connected by a conductor C3 to the motor run winding 41b. The motor run winding energizing circuit includes (C1 – SW1 – PSWb–SW7–SW8a–C3–41b–PPS–C2). For energizing the start winding 41a, a pair of respective contacts SW10a and SW11a are normally closed. Contact SW10a is connected into the C1 side of circuit 101 by a conductor C4 and through a normally closed switch SW9 to start winding 41a. The winding 41a is connected to the C2 side of circuit 101 via conductor C5, switch contact SW11a and a conductor C6 and the switch PPS (C1 – SW1–PSWb–SW7–SW8a–SW10a–SW9–41a–C5–SW11a–C6–PPS–C2). The switch SW9 is responsive to motor speed, i.e. centrifugal switch, deenergizing the start winding when the motor reaches a predetermined speed. Switch contacts SW8a, SW8b are part of a motor speed selector 122. By operating speed selector 122 to close contact SW8b winding 41c is energized and a slow speed motor operation during the wash cycle can be obtained.

The timer motor TM powering the timer 102 is energized through a normally closed contact SW6a (C1–SW1–PSWb–SW6a–TM–PPS–C2).

Turning to the chart in FIG. 17, it is noted that in the exemplary regular cycle of operation, during the first time period of washer operation, i.e. the wash cycle, the control circuit switch contacts SW1, SW2, SW4a, SW6a, SW7, SW10a and SW11a are closed. In the present instance the timer 102 maintains a wash cycle for 10 minutes. At the end of the cycle contacts SW2, SW7, SW10a are opened. There is a pause of 1 minute permitting the motor to decelerate and stop before it is energized for reverse rotation.

The second time period of washer operation, a portion of the extraction cycle, is begun by reversing the motor. This occurs in response to the timer closing contacts SW12, SW10b, SW11b. As is clear from the circuit diagram of FIG. 16, closing of contact SW12 completes an energizing circuit for the motor run winding 41b through a normally closed switch contact SW13a (C1–DSW–SW12–SW13a–41b–PPS–C2). The closing of contacts SW10b and SW11b reverses the phase of the power in start winding 41a as compared to what it was when contacts SW10a and SW11a were closed (C1–SW12–SW13a – C3 – C4 – SW11b – C5 – 41a – SW9 – SW10b–C6–PPS–C2). Switch SW13 is also a part of the speed selector 122 and either contact SW13a can be closed for normal motor speed operation or contact SW13b can be closed for slow motor speed operation. This provides a fast and slow drive to spin basket 19.

Reverse rotation of the motor, effected by the control circuit in response to spin instructions from the timer 102, stops recirculation operation of pump 56 and starts drain operation of impeller 104. Liquid is thereby removed from the tub.

As part of the spin instructions, the timer 102 closes a contact SW14 in the control circuit 101 to energize brake solenoid 84 (C1–DSW–SW14–84–PPS–C2). The by-pass switch SW1 is open making the switch DSW effective to deenergize the circuit 101 should the door be opened. In the energizing circuit for the clutch solenoid 98, contact SW15a is closed. However, the circuit 101 will not energize the clutch solenoid until the pressure switch contact PSWa is closed as well as a sub-interval switch SIS (C1–DSW–PSWa–SIS–SW15a–98–PPS–C2). The pressure switch 35 maintains contact PSWb closed and PSWa open until the liquid level in the tub is lowered to a predetermined point whereupon contact PSWa is closed. In practice it has been found to be advantageous to lower the liquid below the point at which connector 131 joins sump 110. As a part of a basket acceleration and coast operation explained later, the switch SIS is closed for a short time interval.

The timer motor TM is deenergized at the beginning of the spin cycle after reverse rotation of the motor 41 has begun and pump 56 is draining liquid from the tub. Deenergization occurs when the timer 102 opens contact SW6a and closes contact SW6b. The timer motor is not energized again until the tub is empty and pressure switch contact PSWa is closed. Accordingly, there is not a fixed time in which the tub must empty.

LIQUID LEVEL SENSOR AND CONTROL

To transmit tub liquid level information to control circuit 101 a tub liquid level sensor, in the present instance a fluid circuit 130, operates switch 35 (see FIG. 13). Because the illustrative sensor is of the pressure type a pressure type switch 35 is used. It is understood that other liquid level sensors could be utilized. The fluid circuit senses the water level as represented by a head of water in the tub 16 and transduces this information into a pressure in an air pressure tube 132. The latter is coupled to the drain sump 110 at the bottom of the tub by a connector conduit 131. Water seeking the same level in the fluid circuit 130 as in the tub 16 traps air in the upper portion of the tub 132 and compresses it.

As best shown in FIGS. 9, 10, and 11, the air tube 132 is connected to transmit the air pressure therein to pressure switch 35 and operate contacts PSWa and PSWb. In the present instance the pressure switch includes a hub-shaped annular body 135 having opposite open ends with a complementarily shaped and generally concave cover 136 fitted over the larger of the open ends. A diaphragm 138 of flexible material, for example rubber, is installed to form a wall between the body 135 and cover 136 and define a pair of separated chambers 139, 140 within the body-cover enclosure.

The fluid circuit tube 132 is coupled to a fitting 141 carried by the cover 136. Accordingly, air pressure variations in the fluid circuit effected by changes in the tub water level are applied as a force to flex the diaphragm 138. To prevent momentary pressure build-ups resulting, for example, from a toroidal column of water created about the tub sides during spinning of the basket, from acting on the diaphragm an orifice 161 is provided in fluid line 132. The restriction to air flow thereby effected absorbs surges of pressure due to transients liquid level conditions in the tub.

Responsive to movements of the diaphragm is a switch mechanism 142 in chamber 140 including a slidable switch block 144 operating a movable snap or toggle switch element 145 which closes respective ones of the pressure switch contacts PSWa, PSWb. The switch block is biased by a spring assembly 146 to act against the pressure force applied to diaphragm 138 and transmitted to the block by a plate 138a centrally carried by diaphragm 138.

The block 144 and spring assembly 146 are carried in a rearwardly extending cylindrical portion 148 of the switch body 135, the block 144 being biased toward the diaphragm 138 by a spring 149. The rear end of spring 149 is received in a cap 150 and both fit into the cylindrical opening in rear body portion 148. A lever and screw 151, 151a respectively, act on the cap to maintain a spring force on the block.

Manual selection of spring compression and thereby the pressure necessary in fluid circuit 130 to actuate switch contacts PSW to close contact PSWb is made by pivotally positioning lever 151. To this end a bracket 152 is mounted on the switch body 135 and a control shaft 153 is rotatably carried between upstanding arms 154, 155. Lever 151 is pivotally supported by arm 155 and shaft 153 carries a cam 156 having a camming surface 156a engaging one end of lever 151 to pivot it and apply or release compressive force on spring 149. The rotatable water level control 34 is connected to the shaft 153 and, in the present instance, can be manually turned to one position rotating the shaft and compressing the spring so that the switch does not trip until the tub is filled to a "high" level or turned to other respective positions releasing the spring and thereby adjusting the controls for automatic fill of the tub to "medium" or "low" levels, respectively. The screw 151a permits initial adjustment of the pressure switch so that the respective water levels at which the switch 35 trips, i.e., low, medium and high, correspond to desired water levels in the tub.

After the movable element 145 in switch 35 is actuated and contact PSWb is closed in response to the tub filling with liquid to a predetermined "high" level or point, the contact remains closed until the liquid is lowered whereupon the switch resets or returns to contact PSWa. In other words, the element 145 is actuated from a first position, contact PSWa closed, to a second position, PSWb closed and PSWa open, in response to a selected high liquid level in the tub. To provide a substantially constant reset or return pressure corresponding to a predetermined low liquid level in the tub and sump, the switch block 144 is biased by a second independently adjustable spring assembly 157. Thus, regardless of what pressure is required to trip the switch and stop liquid input to the tub, the switch will not return from its second or tripped position, PSWb closed, to its first or reset position, PSWa closed, until the pressure is below a predetermined value corresponding to a predetermined low liquid level.

It is clear from the foregoing that in the ordinary operation of the washer, the liquid level sensor switch 35 is actuated to its second position when the tub is filled to the selected level. This occurs before spin instructions are transmitted to the control circuit 101, indeed before the wash-agitate cycle begins. When the liquid level is lowered below a predetermined point, the switch 35 returns or resets to its first position and circuit 101 is ready to engage clutch 87.

Assume, however, that the sequential control dial 102a is advanced to the "spin" position by a housewife having decided not to wash her clothes during filling of the tub and while switch contacts PSW of switch 35 are still in their first position. As noted, the contacts PSW of switch 35 in their first position effect spin drive of the basket. This would flush the liquid out of the tub and most likely overload the motor.

To prevent the occurrence of these events, the preferred embodiment utilizes a safety control to insure that the liquid level in the tub is lowered to a predetermined low level before the spin drive to the basket is engaged to prevent spinning of the basket when the tub is partially filled with liquid. The safety control is the subject of a copending application of Carl J. Knerr, Serial No. 371,245, filed June 1, 1964. It is a feature which can be used with the present invention described in detail subsequently.

As herein illustrated, the safety control includes a supplemental pressure creating means, exemplified by dashpot 160, to actuate pressure switch contacts PSW from their first position, maintained during filling of the tub, to their second position, assumed ordinarily when the tub is filled to the selected level. Thus, in effect, the safety control simulates a high liquid level condition in tub 16.

As can be seen from the circuits in FIGS. 16 and 18, the respective first and second switch positions are here shown as PSWa and PSWb respectively. The clutch solenoid cannot be energized until the switch PSW is actuated or "reset" and contact b is opened while contact a is closed. This occurs only after the pressure applied to pressure switch 35, including the water level pressure and the supplemental pressure, bleeds down from fluid circuit 130. Bleeding of the air pressure occurs as the head of liquid in the tub is lowered by the pump 56. Drain operation of the pump occurs immediately upon the feeding of spin instructions to circuit 101. The orifice 161 is helpful in restricting the escape of fluid out of a pressure switch portion 130a of fluid circuit 130. Thus, operation of the dashpot 160 in setting the switch contacts PSW is aided.

Describing the supplemental pressure creating dashpot 160, as best shown in FIG. 8, it includes a housing 164 and a cover 165 which, assembled, define a pair of enclosures 166, 168 separated by a movable diaphragm 169, in the present instance constructed of suitable flexible material such as rubber. To effect operation of the dashpot in response to spin instructions from the programmer, in the illustrative embodiment a shaft 170 is slidably received in an end wall of the housing 164 and couples the brake solenoid armature 85 to the diaphragm 169. The diaphragm 169 has a centrally positioned plate 171 of inflexible material which the end of shaft 170 acts upon. The diaphragm 169 is biased in a normal position by the spring 172 in the chamber 168.

Upon actuation of the brake solenoid armature initiated by spin instructions from the programmer, the shaft 170 acts against the diaphragm plate 171 and the biasing force of spring 172 to move the diaphragm and force air through a conduit 174 coupling the dashpot 160 to the pressure switch 35 and the tube 132 of the fluid circuit 130. The fluid circuit is divided by orifice 161 into the pressure switch portion 130a and a tub portion 130b. As here shown, in order to most efficiently utilize the movement of dashpot diaphragm 169 to apply a force on pressure switch diaphragm 138 the dashpot 160 is connected into the pressure switch side 130a of fluid circuit 130. Thus, the pressure impulse effected by operation of the dashpot 160 acts on the diaphragm 138 of pressure switch 35 to set the contacts PSW in their high liquid level position.

The safety control is particularly useful if the housewife advances the timer knob 102a to spin operation during filling of the tub either in the wash cycle or in the rinse-agitate cycle. Such advances of the knob 102a feed spin instructions to the control circuit 101 while the pressure switch PSW is still in its first or empty position and the circuit would respond by coupling the second drive train for spinning the basket while the tub is still partially filled with liquid. The structure insures that the basket is not spun until the liquid in the tub is lowered to the predetermined "low" level. The safety control sets the liquid level sensor switch in the tripped or high liquid level position so that the washer proceeds through the customary cycle of liquid removal before the spin drive to the motor is engaged.

The terms "high" liquid level and "low" liquid level used in describing responsive movements of switch PSW in sensing liquid level in tub 16 are not to be confused with marked settings for the water level control 34. The "H," "M," and "L" settings of the latter identify relative levels to which the tub is filled before switch PSW is actuated. Thus, even though the relative tub liquid level may be low because the control is set to "L," the switch PSW senses the top of the tub liquid level as a "high" liquid level. The reset bias assembly 157 in the pressure switch 35 assures that the same low liquid level trips the switch upon each lowering of the liquid level in the tub.

The regular cycle of operation for a washer has been explained up to the point where the second time period begins, i.e. the initial suds removal period of the extraction cycle. The programmer 102 has instructed control circuit 101 to energize motor 41 so it rotates in reverse and pump 56 is thereby rotated in reverse to remove wash water from the tub 16. The circuit has been prepared to effect spin rotation of basket 19. That is switch SW14 is closed energizing brake solenoid 84 and releasing the second drive train for transmitting drive to the basket, and clutch solenoid switch contact SW15a is closed. The liquid level sensor switch PSW is in its first position with contact PSWa closed. The timer motor TM has been de-energized to allow the pump 56 all the time it needs to remove the liquid from tub 16. When the pressure switch resets to its first position the timer motor is again energized to operate its associated cams in programmer 102.

Pumping out the wash liquid from the tub does not remove suds laden water trapped in the clothes or articles being washed. The trapped liquid and suds increases the suspension of detergents, soaps and the like in the liquid used for the subsequent final rinse and thus decreases its efficiency. The result is that clothes over a long period of washing accumulate cleaning agent. Several procedures can be used to remove the suds prior to the final rinse. For example, extensive drenching with rinse liquid could be used; or soaking in fresh rinse liquid and draining the rinse water to, in effect, include an additional rinse period could also be used. These procedures, of course, require an increased use of liquid and add time to the wash cycle.

A more efficient procedure for removing suds-laden liquid in the clothes, fabrics and the like is to spin the basket and propel liquid and suds through the perforate basket by centrifugal force. However, suds created in the spinning of the basket have filled the space between the rotating basket and the stationary tub to load the motor and reduce the speed of the basket to where it is ineffective in spinning out suds and liquid.

In accordance with the present invention, a system is provided for spin removal of suds-laden liquid from articles being washed while eliminating the occurrence of suds lock. In the illustrative embodiment, the first step during the initial suds removal time period as initiated by first spin instructions from the programmer 102 is for pump 56 to drain the tub. During this period the basket is substantially stationary because the clutch control permits selective engagement and disengagement of drive in the second or spin drive train. In other words, even though reverse rotation of motor 41 operating the drain system 106 of pump 56 ordinarily would effect drive through one-way clutch 87, the selective drive control maintains the one-way clutch disengaged until the tub is drained.

Next, the basket is accelerated and then permitted to coast spin. This is effected by engaging clutch 87 and then disengaging it after a predetermined time period. As will become clear from subsequent description of the washer program, the basket is only driven for a fraction of the time period that drive is transmitted to basket 19 during normal spinning out of liquid from the clothes. In practice it has been found to be advantageous to engage the clutch for approximately 15 seconds thereby bringing the basket up to a rotational speed of approximately 200 r.p.m. Explaining the drive engaging structure, though switch SW15a is closed, the clutch solenoid 98 is not energized until the circuit 101 is actuated or instructed by timer 102, in the present instance by closing of sub-interval switch SIS (see simplified circuit diagram of FIG. 18). In the commercial unit described, the switch SIS is closed for approximately 15 seconds to accelerate the basket to a portion of full speed and then permit it to coast. During this acceleration and coast period, wash water and suds trapped in the clothes are ejected by centrifugal force.

A following step includes introduction of a rinse liquid as the basket is spinning. The result is a spray effect aiding the wash down of suds. In the illustrative embodiment a switch contact SW16a is closed and the water valve solenoids 115, 116 are energized to introduce fresh water into the tub through valve 31 for one minute, thereby diluting the suds and wash water and preventing suds-lock. At this point the basket has been accelerated and is coasting. The temperature of the rinse water is selected by adjustment of a rinse water switch RSW which operates in the same manner as the wash water switch WSW, previously explained. Preferably only cold water is used in this rinse operation. As is clear from the sequence chart of FIG. 17, while the switch SW16a energizes the water valve solenoids through the rinse water temperature selector switch RSW and switch contact SW4b, the motor is rotating in the reverse direction and, even though the basket is not connected thereto because the clutch solenoid 98 is not energized, the pump 56 is operating in reverse removing the rinse and wash water from the tub.

The pump operates for the full six minutes of the initial suds removal or, as herein designated, second time period of the washer program. Because the motor is operating at full speed, except when slightly slowed down during the interval engagement of clutch 98, the pump 56 is operating at full capacity. This assures efficient and quick removal of sudsy liquid and further aids in preventing suds lock. This empties the tub and prepares the machine for subsequent spinning of the basket.

Finally, a spin is imparted to the basket to force out the remaining liquid. In the present instance this lasts for approximately two minutes to complete the initial suds removal period. The additional spin forces out amounts of suds and wash water after the spray down with fresh water. To effect spinning, as is shown in the chart of FIG. 17, the switch SW14 energizing the brake solenoid is closed and the brake is released so it is only necessary to engage clutch 87. To energize the clutch solenoid 98 independently of sub-interval switch SIS, switch SW15 is moved so as to close contact b thereby connecting clutch solenoid 98 across electrical source C1–C2 (C1–DSW–PSWa–SW15b–98–PPS–C2).

The extraction cycle continues after the initial suds removal period with the timer opening the motor switch SW12 for one minute to permit the motor to coast to a stop. During this last minute the rinse water switch contact SW15a is closed thereby operating water input control valve 31 and filling the tub with rinse water. The liquid level sensor 130 operates switch 35 and closes contact PSWb when the rinse water in the tub has reached a level corresponding to that preset by liquid control 34.

Next the timer operates the contacts SW7, SW10, SW11 to energize motor 41 for rotation in a forward direction. The first drive train is operative to oscillate the agitator while the tub is full of rinse water. As can be seen from the chart of FIG. 17, the brake solenoid switch SW14, the clutch solenoid switch SW15 are open. Thus the solenoids are deenergized and the circuit 101 is in the same state as it was during the "wash" cycle except that the wash water switch contact SW16a is closed. While the motor is rotating in the forward direction, the recirculation system 105 of pump 56 is operative.

The rinse agitate cycle continues for four minutes whereupon the forward or agitate direction motor control switch contact SW7 is opened by timer 102 deenergizing the motor and stopping the agitator. There is a one minute pause before the next operation.

As a last step the motor is rotated in reverse by closing motor control switch contact SW12 and contacts SW10b, SW11b (the energizing circuit has been described before). The liquid removal system 106 of pump 56 is put into operation to empty the liquid from tub 16. The brake solenoid 84 is energized by closing contact SW14 releasing the second drive train for spinning the basket 19. The liquid level sensor switch 35 is actuated when the tub empties, opening contact PSWa and closing contact PSWb, and clutch control switch contact SW15b is closed completing a circuit for energizing clutch solenoid 98 and engaging the second drive train. The basket 19 is spun, in the illustrated washer program, for six minutes This is the normal spin period effecting application of drive to the basket for a much longer period of time than the first spin instructions which operated the basket to only remove a portion of the suds and wash water retained in the clothes after draining of the tub. During this time, the pump 56 is operated, the drain system 106 being utilized to remove liquid from tub 16.

What is claimed is:

1. In a control system for a washer having a tub for receiving and holding a liquid and a basket rotatably supported in the tub to form a container for articles, the basket coupled to a motor through a drive train to spin the basket, the combination comprising: means for controlling feeding of liquid into the tub, means for removing liquid from the tub, means for sensing the liquid level in the tub, means in said drive train for selectively engaging and disengaging the drive connection between the motor and basket, an electrical source, a circuit energized by said electrical source and coupled to said liquid sensing means and to said drive operating means, a programmer having selected instructions stored therein for sequential feed-out including first spin instructions for effecting acceleration of the basket to a first predetermined speed and second spin instructions for effecting continual spinning of said basket, said first spin instructions effecting driving of said basket for only a fraction of the time period that said second spin instructions effect basket drive, circuit means coupled to said programmer and responsive thereto to actuate said drive operating means, said liquid removal means coupled to said programmer and responsive to spin instructions therefrom to remove liquid from the tub, said circuit responsive to a tub empty indication from said liquid level sensing means and to programmer actuation of said circuit means to engage said drive train means thereby accelerating said basket, said programmer effecting disengagement of said drive train after a preselected interval of time, said engagement and subsequent disengagement of said drive means effecting an acceleration and then a coast of the basket to extract wash liquid carried by the articles, and means coupling said programmer to said liquid feed control means to introduce liquid while said basket is coasting to wash down suds.

2. In a control system for a washer having a tub for receiving and holding a liquid and a basket rotatably supported in the tub to form a container for articles, the basket coupled to a motor through a drive train to spin the basket, the combination comprising; means for controlling feeding of liquid into the tub, means for removing liquid from the tub, means for sensing the liquid level in the tub, a one-way clutch in said drive train selectively engageable and disengageable to control the drive connection between the motor and basket, an electrical source, a circuit energized by said electrical source and coupled to said liquid sensing means and to said drive operating means, a programmer having selected instructions stored therein for sequential feed-out including first spin instructions for effecting acceleration of the basket to a first predetermined speed and second spin instructions for effecting continual spinning of said basket, said first spin instructions effecting driving of said basket for only a fraction of the time period that said second spin instructions effect basket drive, circuit means coupled to said programmer and responsive thereto to engage and disengage said clutch, said liquid removal means coupled to said programmer and responsive to spin instructions therefrom to remove liquid from the tub, said circuit responsive to a tub empty indication from said liquid level sensing means and to programmer actuation of said circuit means to engage said one-way clutch thereby accelerating said basket, said programmer effecting disengagement of said one-way clutch after a preselected interval of time, said engagement and subsequent disengagement of said clutch effecting an acceleration and then a coast of the basket during which time suds-laden wash water is extracted from the articles, and means coupling said programmer to said liquid feed control means to introduce liquid while said basket is coasting to wash down suds.

3. In a washing machine the combination comprising a tub for receiving and holding a liquid, a basket rotatably supported in the tub and forming a container for clothes and the like, an agitator mounted in said basket for agitating clothes and the like therein during a wash cycle, a motor, first and second drive trains for drivingly coupling the motor to the agitator and basket respectively, means for selectively engaging said second drive train, an electrical source, a circuit energized by said electrical source and coupled to said motor and to said second drive train engaging means, means coupled to said circuit for removing liquid from said tub, a programmer coupled to said circuit for transmitting wash and spin instructions to said circuit, including first spin instructions for effecting acceleration of the basket to a first predetermned speed and second spin instructions for effecting continual spinning of said basket, said first spin instructions effecting driving of said basket for only a fraction of the time period that said second spin instructions effect basket drive, said programmer feeding wash instructions to said circuit for a first period of time, said circuit responding by energizing said motor to transmit drive through said first drive train to said agitating means, said programmer feeding said first spin instructions to said circuit during a second period of time following said first period, said circuit responding by first operating said liquid removal means and subsequently preparing to operate said second drive train engaging means to spin said basket, means in said circuit responsive to said first spin instructions from said programmer to effect operation of said second drive means for said fractional time length to accelerate said basket and then permit it to coast, and means responsive to said programmer coupled to said circuit to operate said liquid control means during said coast portion of said time period to introduce liquid into said tub to prevent suds lock.

4. In a control system for a washer having a tub for receiving and holding a liquid and a basket rotatably supported in the tub to form a container for articles, the basket coupled to a motor through a drive train to spin the basket, the combination comprising, means in the drive train for selectively engaging and disengaging the drive connection between the motor and the basket, a programmer having selected instructions stored therein for sequential feed-out including first spin instructions for effecting acceleration of the basket to a first predetermined speed and second spin instructions for effecting continual spinning of said basket, said first spin instructions effecting driving of said basket for only a fraction of the time period that said second spin instructions effect basket drive, a circuit for coupling said programmer to said drive train engaging means, said circuit responsive to said programmer first spin instructions to effect engagement of said drive train means thereby accelerating said basket and after a preselected interval of time to effect disengagement of said drive train means and permit said basket to coast, and means responsive to said programmer first spin instructions for introducing liquid into the tub after disengagement of drive to said basket to wash down suds.

References Cited by the Examiner

UNITED STATES PATENTS

| | | | |
|---|---|---|---|
| 2,168,068 | 8/1939 | Loweke | 8—159 |
| 2,611,256 | 9/1952 | Candor | 68—12 |
| 2,662,384 | 12/1953 | Morrison et al. | 68—12 |
| 2,931,199 | 4/1960 | Steffey | 68—12 |
| 2,942,446 | 6/1960 | Platt et al. | 68—23 |
| 3,046,081 | 7/1962 | Smith et al. | 8—159 |

OTHER REFERENCES

Rosenkrans: Abstract of Serial No. 2,013, published May 8, 1951, O.G. 646, O.G. 669.

WILLIAM I. PRICE, *Primary Examiner.*